United States Patent
Foutz et al.

(10) Patent No.: US 12,475,288 B1
(45) Date of Patent: Nov. 18, 2025

(54) CLOCK-BASED TEST-POINT FLOP SHARING IN A CIRCUIT DESIGN

(71) Applicant: Cadence Design Systems, Inc., San Jose, CA (US)

(72) Inventors: Brian Foutz, Charlottesville, VA (US); Vivek Chickermane, Slaterville Springs, NY (US); Bharath Nandakumar, New Delhi (IN); Sameer Chakravarthy Chillarige, Bengaluru (IN); Krishna Chakravadhanula, Vestal, NY (US); Prateek Kumar Rai, Uttar Pradesh (IN); Sarthak Singhal, Noida-Uttar Pradesh (IN)

(73) Assignee: Cadence Design Systems, Inc., San Jose, CA (US)

( * ) Notice: Subject to any disclaimer, the term of this patent is extended or adjusted under 35 U.S.C. 154(b) by 580 days.

(21) Appl. No.: 17/953,693

(22) Filed: Sep. 27, 2022

(51) Int. Cl.
*G06F 30/30* (2020.01)
*G01R 31/317* (2006.01)
*G01R 31/3185* (2006.01)
*G06F 30/323* (2020.01)
*G06F 30/333* (2020.01)
*G06F 30/392* (2020.01)

(52) U.S. Cl.
CPC ..... *G06F 30/333* (2020.01); *G01R 31/31704* (2013.01); *G01R 31/318583* (2013.01); *G06F 30/323* (2020.01); *G06F 30/392* (2020.01)

(58) Field of Classification Search
None
See application file for complete search history.

(56) References Cited

U.S. PATENT DOCUMENTS

| | | | |
|---|---|---|---|
| 10,528,692 B1* | 1/2020 | Guo | G06F 30/327 |
| 2005/0091622 A1* | 4/2005 | Pappu | G01R 31/318591 |
| | | | 716/108 |

OTHER PUBLICATIONS

M. Youssef et al., "Methodology for efficiently inserting and condensing test points," IEE Proceedings-E, vol. 140, No. 3, May 1993, pp. 154-160. (Year: 1993).*

M. Nakao et al., "Low Overhead Test Point Insertion for Scan-based BIST," ITC Int'l Test Conference, Paper 14.1, 1999 IEEE, pp. 348-357. (Year: 1999).*

(Continued)

*Primary Examiner* — Leigh M Garbowski
(74) *Attorney, Agent, or Firm* — Foley & Lardner LLP (57) ABSTRACT

A system includes a memory that stores instructions and receives a circuit netlist, and includes a processing unit that accesses the memory and executes the instructions. The instructions include an EDA application that includes a test-point flop allocation module that divide the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group. The test-point flop allocation module can further allocate one of the test-point flops to each of the test-point sharing groups. The EDA application also includes a circuit layout module configured to generate a circuit layout associated with the circuit design based on the circuit netlist. The circuit layout is employable to fabricate an IC chip.

20 Claims, 8 Drawing Sheets

(56) References Cited

OTHER PUBLICATIONS

J.-S. Yang et al., "Test Point Insertion Using Functional Flip-Flops to Drive Control Points," Int'l Test Conference, Paper 17.3, 2009 IEEE, pp. 1-10. (Year: 2009).*
N. Devta-Prasanna et al., "Clock Gate Test Points," Int'l Test Conference, Paper 3.2, 2010 IEEE, pp. 1-10. (Year: 2010) (Year: 2010).*
C. Papameletis et al., "Optimized Physical DFT Synthesis of Unified Compression and LBIST for Automotive Applications," Int'l Test Conference, 2019 IEEE, pp. 1-6. (Year: 2019).*
N. Mukherjee et al., "Time and Area Optimized Testing of Automotive ICs," IEEE Trans. on Very Large Scale Integration (VLSI) Systems. vol. 29, No. 1, Jan. 2021, pp. 76-88. (Year: 2021).*

\* cited by examiner

CLOCK-BASED TEST-POINT FLOP SHARING IN A CIRCUIT DESIGN

TECHNICAL FIELD

The present description relates generally to circuit design systems, and specifically to clock-based test-point flop sharing in a circuit design.

BACKGROUND

Modern circuit designs often include dedicated testing circuitry to allow a fabricated circuit to be tested. Such dedicated testing circuitry can include scan-chains that allows multiple test-point nodes interconnecting functional logic to be monitored (e.g., via an observe test-point flop) or to be controlled (e.g., via a control test-point flop). The data on test-point nodes can thus be coupled via scan-chains that include the test-point flops to allow a readout of the data at all of the test-point nodes or to read in data that is to be provided to the functional logic for testing. To provide for more efficient dedicated testing circuitry, the test-point nodes can be logically coupled, such that multiple test-point nodes can be coupled to a single test-point flop. Therefore, the number of test-point flops can be reduced in a given circuit design. However, like the functional logic in the fabricated circuit corresponding to the circuit design, the test-point circuitry is physically provided in the circuit layout. Because test-points can be numerous (e.g., several thousand) and can be distributed across the physical layout of the circuit, extensive interconnect wiring between the test-point flops and the test-point nodes can be required.

SUMMARY

A system includes a memory that stores instructions and receives a circuit netlist, and includes a processing unit that accesses the memory and executes the instructions. The instructions include an EDA application that includes a test-point flop allocation module that divide the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group. The test-point flop allocation module can further allocate one of the test-point flops to each of the test-point sharing groups. The EDA application also includes a circuit layout module configured to generate a circuit layout associated with the circuit design based on the circuit netlist. The circuit layout is employable to fabricate an IC chip.

Another example includes a non-transitory computer readable medium having machine-readable instructions. The machine-readable instructions are executed to receive, at a circuit design tool executing on a computing platform, a circuit netlist comprising functional logic, test-point nodes coupled to portions of the functional logic, a plurality of clock-gates, and a plurality of test-point flops associated with scan-chains. The machine readable instructions are also configured to divide the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group. The machine readable instructions are also configured to allocate one of the test-point flops to each of the test-point sharing groups in the circuit netlist via the test-point flop allocation module executing on the computing platform. The machine readable instructions are further configured to generate a circuit layout associated with the circuit design based on the circuit netlist via a circuit layout module executing on the computing platform, wherein the circuit layout is employable to fabricate an integrated circuit (IC) chip.

Another example includes a method for allocating test-point flops in scan-chains of a circuit design. The method includes receiving, at a circuit design tool executing on a computing platform, a circuit netlist comprising functional logic, test-point nodes coupled to portions of the functional logic, a plurality of clock-gates, and a plurality of test-point flops associated with scan-chains. The method includes dividing the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group. The method also includes allocating one of the test-point flops to each of the test-point sharing groups via the test-point flop allocation module executing on the computing platform. The method also includes assigning a clock signal to the test-point flop associated with each of the test-point sharing groups via the test-point flop allocation module executing on the computing platform. The clock signal can be output from a respective one of the clock-gates that is common to each of at least one flip-flop of the portion of the functional logic coupled to the test-point nodes of the respective one of the test-point sharing groups. The method further includes generating a circuit layout associated with the circuit design based on the circuit netlist via a circuit layout module executing on the computing platform. The circuit layout is employable to fabricate an IC chip.

DETAILED DESCRIPTION

The present description relates generally to circuit design systems, and specifically to clock-based test-point flop sharing in a circuit design. As described herein, a test-point flop allocation module can provide the test-point flop allocation as corresponding to the association of the test-point nodes to clock-gates of the circuit design. Thus, a given test-point flop can be associated with multiple test-point nodes of a given one test-point sharing group that is associated with a respective one of the clock-gates of the circuit design. The test-point flop allocation module can be implemented as one tool of a suite of tools in an electronic design automation (EDA) application, such as implemented in a circuit design tool. For example, a circuit design tool can include a processor and a memory that is configured to store the EDA applications. The processor can access the memory to facilitate generation of a circuit design in response to a circuit netlist (e.g., provided by a user) that is likewise stored in the memory.

The circuit design tool can receive a circuit netlist that defines characteristics of the circuit design to be provided in a resultant fabricated integrated circuit (IC). The circuit netlist can include functional logic, test-point nodes coupled to portions of the functional logic. clock-gates that define a clock domain and that provide a selectively activated clock signal, and test-point flops coupled to the test-point nodes and which are associated with scan-chains. The test-point flop allocation module can be implemented to allocate the test-point flops to the test-point sharing groups in a circuit synthesis phase of the circuit design tool, and thus prior to implementation of a circuit layout module that generates a circuit layout corresponding to a physical layout of the circuit design.

As an example, the test-point flop allocation module can be implemented to determine a clock-gate that is common to a set of flip-flops in a portion of functional logic that is coupled to a given one of the test-point nodes. As described herein, the portion of the functional logic coupled to the test-point node can correspond to a portion of the functional logic at an input of the test-point node, and thus corresponds to logic that is upstream (e.g., logic fan-in) of the respective test-point node. Thus, as an example, the test-point flop allocation module can be configured to trace input/output connections backwards on the circuit netlist from the test-point node to an output of each of the one or more flip-flops in the portion of the functional logic, from a clock input of each of the flip-flop(s) to an output of each of the clock-gates, and from an input of each of the clock-gates to a clock signal that defines an associated clock domain. Therefore, the test-point flop allocation module can determine the respective one of the clock-gates that is common and most directly electrically coupled to each of the flip-flop(s) of the portion of the functional logic to associate the test-point node to the respective clock-gate. As a result, all test-point nodes that are associated with the respective clock-gate can be designated as a test-point sharing group that is defined by the association to the respective clock-gate. Accordingly, the test-point flop allocation module can allocate a test-point flop to each of the test-point sharing groups.

As an example, the EDA applications can also include the above described circuit layout module that is configured to generate a circuit layout corresponding to a physical layout of the circuit design. Therefore, the circuit layout module can provide a physical location of the test-point flops and the test-point nodes on the circuit layout. Because the test-point nodes are associated with a given one of the clock-gates defined in the circuit netlist, then in response to the circuit layout module generating the circuit layout, the test-point nodes of a given test-point sharing group can be arranged on the circuit layout proximal to each other. Thus, the test-point flops can likewise be allocated on the circuit layout in a manner that is physical proximal to the test-point nodes, such as to provide for a more efficient circuit layout. As an example, the circuit layout module can include a place-and-route tool to provide the physical layout and interconnects of the components of the circuit. Thus, the test-point flop allocation module can cooperate with the place and route tool to relocate the test-point flops based on the relative proximity of the test-point nodes. Accordingly, the test-point flop allocation module can provide for more efficient circuit design by allocating the test-point flops to the test-point sharing groups that are associated by clock-gate, and by physically relocating the test-point flops to mitigate wiring congestion.

Figure 1:
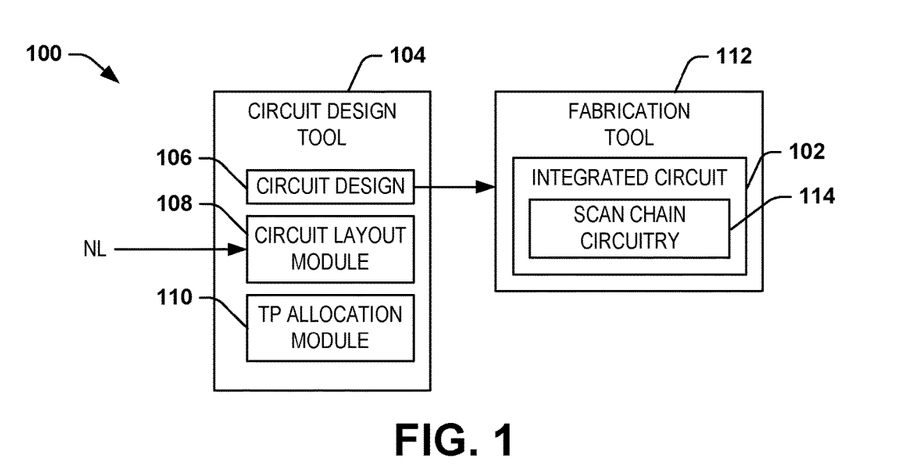
FIG. 1 illustrates an example diagram of design and fabrication of a circuit.

FIG. 1 illustrates an example diagram 100 of design and fabrication of a circuit. The diagram 100 includes functional blocks that can correspond to hardware, firmware, and/or software elements that are directed to the design and fabrication of an integrated circuit (IC) 102. The diagram 100 includes a circuit design tool 104 that is configured to facilitate generation of a circuit design 106 by a user, with the circuit design 106 corresponding to the fabricated IC 102. As an example, the circuit design tool 104 can include a suite of software tools in an electronic design automation (EDA) application. The circuit design tool 104 can be implemented on a computing system that includes a processor and a memory that is configured to store the EDA applications. The processor can access the memory to facilitate generation of the circuit design 106 in response to a circuit netlist. In the example of FIG. 1, the circuit netlist is demonstrated as an input "NL" to the circuit design tool 104.

The circuit design tool 104 includes a circuit layout module 108 and a test-point flop allocation module 110. The circuit layout module 108 can be configured as or can include a place-and-route tool that is configured to generate a circuit layout associated with the circuit design 106 based on the circuit netlist NL. The circuit layout can thus correspond to a physical layout of the components of the circuit design 106, such as including the interconnects of the components of the circuit of the circuit design 106. The circuit netlist NL can define the components to be included in the circuit design 106, including functional logic, test-point nodes coupled to portions of the functional logic, clock-gates that define a clock domain and that provide a selectively activated clock signal, and test-point flops coupled to the test-point nodes and which are associated with scan-chains. Therefore, the circuit layout can include a physical location of each of the test-point nodes and the test-point flops.

Figure 2:
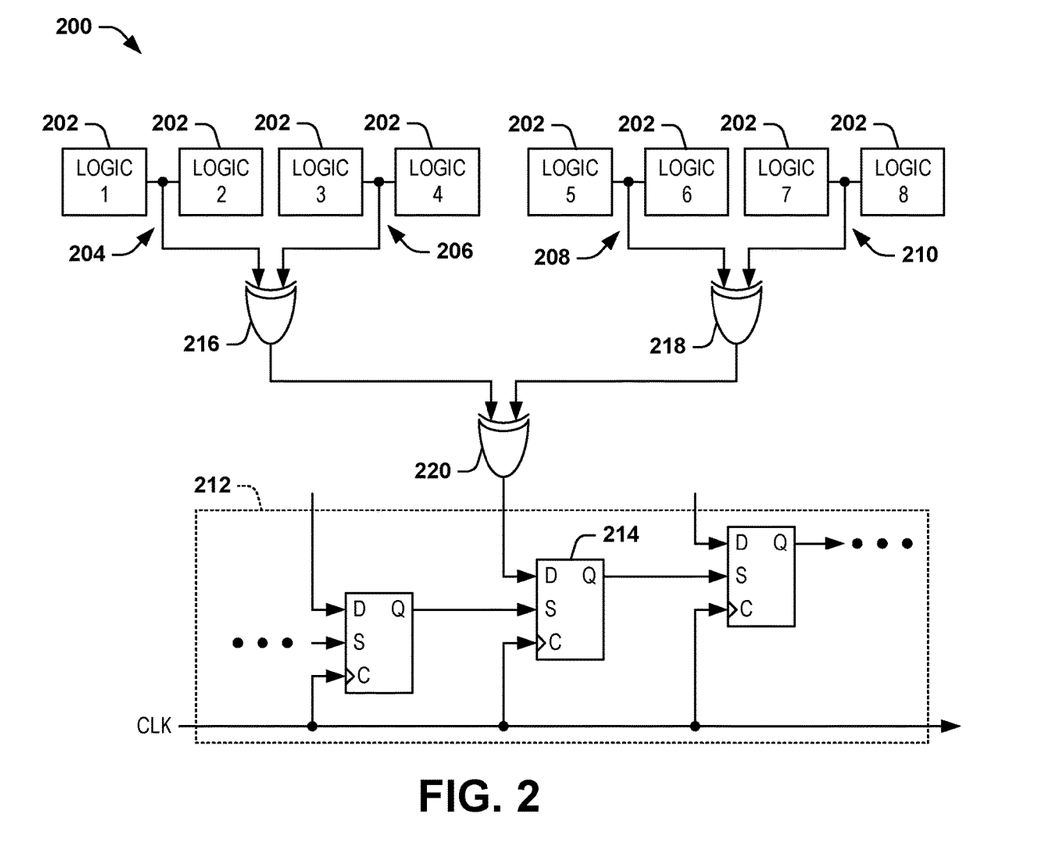
FIG. 2 illustrates an example diagram of test-point sharing of a test-point flop.

FIG. 2 illustrates an example diagram 200 of test-point sharing for a scan-chain. The diagram 200 illustrates a simplified example of the interconnection between functional logic, test-point nodes, and test-point flops of a scan-chain, such as can be provided in the circuit design 106. Therefore, in the following description of the example of FIG. 2, reference is to be made to the example of FIG. 1.

The diagram 200 includes blocks of functional logic 202, labeled as "LOGIC 1" through "LOGIC 8", that can collectively correspond to any of a variety of dedicated functionality of the IC 102 of FIG. 1. In the example of FIG. 2, there is a test-point node 204 interconnecting the first and second functional logic 202, a test-point node 206 interconnecting the third and fourth functional logic 202, a test-point node 208 interconnecting the fifth and sixth functional logic 202, and a test-point node 210 interconnecting the seventh and eighth functional logic 202. As an example, the test-point nodes 204, 206, 208, and 210 can be predefined in the circuit netlist NL. In the example of FIG. 2, the test-point nodes 204, 206, 208, and 210 are demonstrated as observe nodes that are intended to facilitate observation of the data on the test-point nodes 204, 206, 208, and 210.

The diagram 200 also includes a scan-chain 212 that includes the test-point flop 214. Each of the test-point flops 214 includes an output "Q", a data input "D" that receives the data from test-point nodes, a scan input "S" that receives the data from the output of a preceding test-point flop 214 in the scan-chain 212, and a clock input "C" that receives a clock signal CLK. The test-point flops 214 can also include a selection input (not shown) that facilitates selection between the data input "D" and the scan input "S", and thus between collecting data from the test-point nodes and scanning the data out for evaluation.

In the example of FIG. 2, the test-point nodes 204 and 206 are coupled to respective inputs of a first XOR gate 216, and the test-point nodes 208 and 210 are coupled to respective inputs of a second XOR gate 218. The first and second XOR gates 216 and 218 provide outputs that correspond to respective inputs of a third XOR gate 220. The third XOR gate 220 provides an output to the data input "D" of the test-point flop 214. Therefore, the test-point flop 214 receives an input that is shared among the test-point nodes 204, 206, 208, and 210. In this manner, the test-point nodes 204, 206, 208, and 210 can correspond to a single test-point sharing group, as described herein.

Each of the test-point flops in the scan-chain 212, including the test-point flop 214, can receive an input at the data input "D" associated with multiple test-point nodes, similar to as described above. Additionally, the scan-chain 212 can include a great many test-point flops, thus providing data monitoring of hundreds or thousands of test-point nodes. While the example of FIG. 2 demonstrates observe nodes that are intended to facilitate observation of the data on the test-point nodes, the techniques described herein can apply similarly or equally to allocation of test-point control nodes that are configured to force data into the functional logic 202, as well.

As described above, the test-point nodes 204, 206, 208, and 210 can be specified in the circuit netlist NL. As described in greater detail herein, the circuit netlist NL can also include clock domains corresponding to one or more clock signals that are provided to operate the functional logic 202. For example, each of the portions of the functional logic 202 can include one or more flip-flops that are driven by a clock signal. Each of the clock domains can include one or more clock-gates that can provide selective activation of clock signals for driving the flip-flops of the functional logic 202.

Referring back to the example of FIG. 1, the test-point flop allocation module 110 can be configured to divide the test-point nodes defined in the circuit netlist NL into test-point sharing groups, with each of the test-point sharing groups being associated with one of the clock-gates. Therefore, the test-point flop allocation module 110 can ensure that each of the test-point nodes in a given test-point sharing group are driving by the same clock signal, regardless of activation of the respective clock-gate. Furthermore, by associating each of the test-point sharing groups to a respective clock-gate, the circuit layout module 108 can generate the circuit layout in a manner that groups the test-point nodes of a test-point sharing group more proximally with respect to each other. Thus, the allocation of a test-point flop to each of the test-point sharing groups by the test-point flop allocation module 110 can thus likewise result in an arrangement of the test-point flops proximal to the test-point nodes in the respective test-point sharing group in the circuit layout.

In the example of FIG. 1, the circuit design 106 that includes the circuit layout is provided to a fabrication tool 112 that is configured to fabricate the IC 102. The fabricated IC 102 can thus have a physical layout that corresponds to the circuit layout of the circuit design 106. In the example of FIG. 1, the IC 102 includes scan-chain circuitry 114 that includes the test-point flops allocated to the test-point sharing groups based on the assignment of the test-point nodes to the clock-gates, as described herein.

Figure 3:
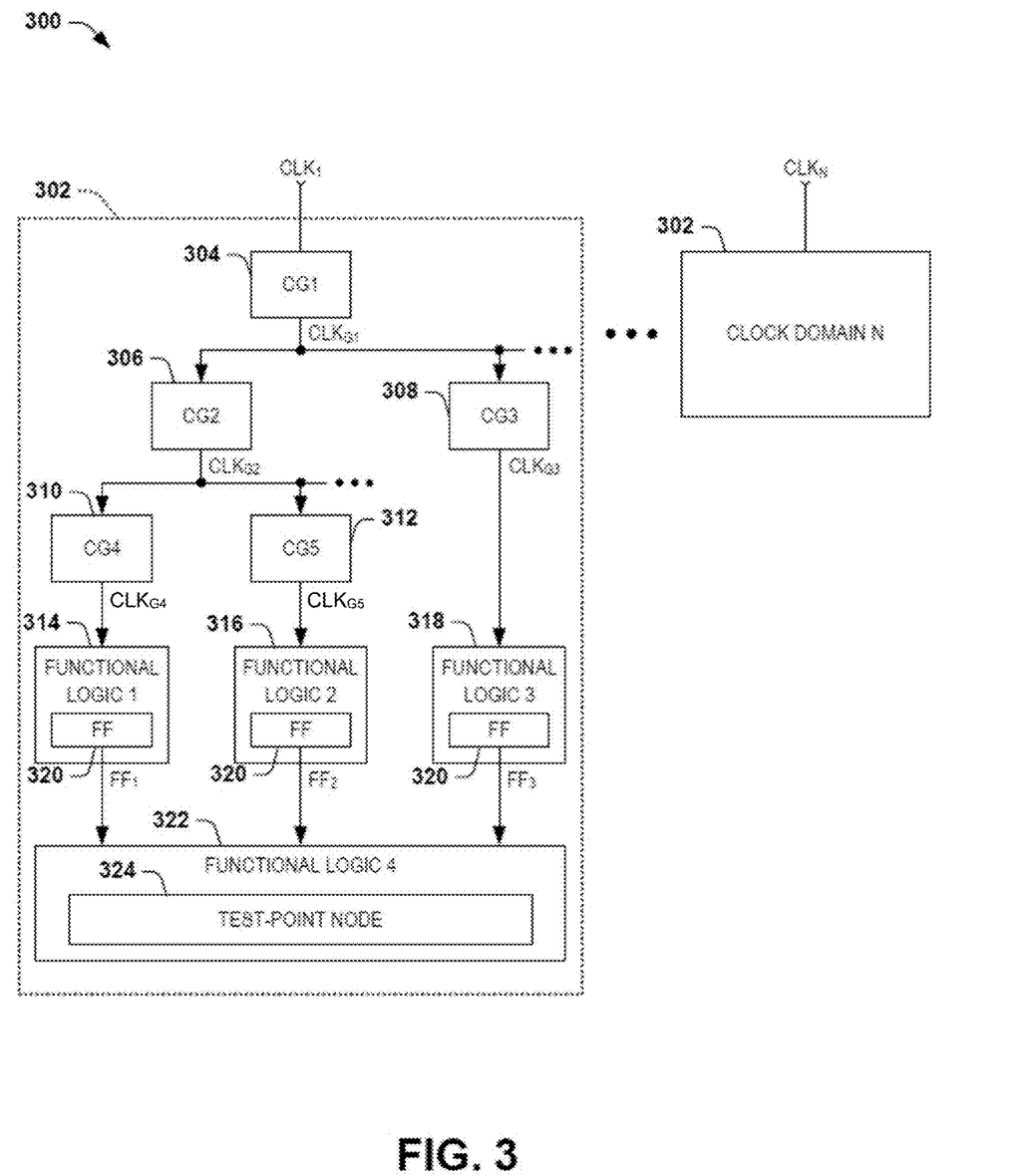
FIG. 3 illustrates an example diagram of clock domains.

FIG. 3 illustrates an example diagram 300 of clock domains. The diagram 300 includes a plurality N of clock domains 302, with N being a positive integer. The clock domains 302 are each defined by a distinct clock signal $CLK_1$ through $CLK_N$ that each provided to drive the functional logic and/or the scan-chains of the IC 102. In the example of FIG. 3, a first clock domain 302 is defined by the clock signal $CLK_1$ and is described in detail herein. The other clock domains 302 can be arranged similar to the first clock domain 302, as described herein.

The clock signal $CLK_1$ in the first clock domain 302 is provided to a first clock-gate 304 that is selectively activated to provide a first clock-gate signal $CLK_{G1}$. The first clock-gate signal $CLK_{G1}$ is provided to a second clock-gate 306 that is selectively activated to provide a second clock-gate signal $CLK_{G2}$ and a third clock-gate 308 that is selectively activated to provide a third clock-gate signal $CLK_{G3}$. In the example of FIG. 3, the first gate clock signal $CLK_{G1}$ can also be provided to other (e.g., not shown) clock-gates or functional logic. The second clock-gate signal $CLK_{G2}$ is provided to a fourth clock-gate 310 that is selectively activated to provide a fourth clock-gate signal $CLK_{G4}$ and a fifth clock-gate 312 that is selectively activated to provide a fifth clock-gate signal $CLK_{G5}$. In the example of FIG. 3, the second gate clock signal $CLK_{G2}$ can also be provided to other (e.g., not shown) clock-gates or functional logic. Therefore, the diagram 300 demonstrates that a given clock domain 302 can include a cascaded arrangement of clock-gates.

The fourth clock-gate signal $CLK_{G4}$ is provided to a first set of functional logic 314, the fifth clock-gate signal $CLK_{G5}$ is provided to a second set of functional logic 316, and the third clock-gate signal $CLK_{G3}$ is provided to a third set of functional logic 318. Each of the sets of functional logic 314, 316, and 318 includes at least one flip-flop ("FF") 320 that is driven by the respective clock-gate signals $CLK_{G4}$, $CLK_{G5}$, and $CLK_{G3}$. The flip-flop(s) 320 each provide respective data signals $FF_1$ through $FF_3$ to a fourth set of functional logic 322 that is coupled to a test-point node 324, as defined in the circuit netlist NL. Thus, the fourth set of functional logic 322 includes an output that corresponds to the test-point node 324.

As described above, the test-point flop allocation module 110 can associate the test-point node 324 to one of the clock-gates 304, 306, 308, 310, and 312. To provide the association of the test-point node 324 to one of the clock-gates 304, 306, 308, 310, and 312, the test-point flop allocation module 110 can evaluate a logic fan-in of the test-point node 324 up to the clock signal $CLK_1$ by tracing inputs and outputs in the circuit netlist NL from the test-point node 324 to the clock signal $CLK_1$. For example, the test-point flop allocation module 110 can trace input/output connections backwards (e.g., upstream) on the circuit netlist NL from the test-point node 324 to an output of each of the flip-flops 320 in the sets of functional logic 314, 316, and 318. The test-point flop allocation module 110 can then trace input/output connections from a clock input of each of the flip-flop 320 to an output of each of the clock-gates 308, 310, and 312. The test-point flop allocation module 110 can then trace input/output connections from an input of each of the clock-gates 308, 310, and 312 to the clock-gates 304 and 306. The test-point flop allocation module 110 can then trace input/output connections from an input of each of the clock-gates 304 and 306 to the clock signal $CLK_1$ that defines the clock domain 302. The test-point flop allocation module 110 can then determine which of the clock-gates 304, 306, 308, 310, and 312 is common to each of the flip-flops 320, and can thus associate the test-point node 324 to the respective one of the common clock-gates 304, 306, 308, 310, and 312.

In the example of FIG. 3, tracing inputs/outputs backwards from the test-point node 324 to the clock signal $CLK_1$, the test-point flop allocation module 110 determines that the flip-flop 320 of the first set of functional logic 314 passes through the fourth clock-gate 310, through the second clock-gate 306, and through the first clock-gate 304 to the clock signal $CLK_1$. Similarly, the test-point flop allocation module 110 determines that the flip-flop 320 of the second set of functional logic 316 passes through the fifth clock-gate 312, through the second clock-gate 306, and through the first clock-gate 304 to the clock signal $CLK_1$. Furthermore, the test-point flop allocation module 110 determines that the flip-flop 320 of the third set of functional logic 318 passes through the third clock-gate 308 and through the first clock-gate 304 to the clock signal $CLK_1$. Therefore, the test-point flop allocation module 110 can determine that the only clock-gate that is common to the flip-flops 320 of the sets of functional logic 314, 316, and 318 is the first clock-gate 304. Therefore, the test-point flop allocation module 110 can associate the test-point node 324 to the first clock-gate 304.

The test-point flop allocation module 110 can repeat the upstream logic input/output (I/O) tracing for each test-point node in the first clock domain 302. Upon associating each of the test-point nodes to clock-gates, the test-point flop allocation module 110 can designate test-point nodes that have common clock-gate associations as test-point sharing groups. Thus, based on the above upstream logic I/O tracing, the test-point flop allocation module 110 can designate each of the test-point nodes that are associated to the first clock-gate 304 as a single test-point sharing group. The test-point flop allocation module 110 can also repeat the upstream logic input/output I/O tracing for each of the test-point nodes in each of the other clock domains 302, thereby generating a plurality of test-point sharing nodes.

The test-point flop allocation module 110 can thus allocate a test-point flop to each of the test-point sharing groups, such that the test-point flop observes data from each of the test-point nodes in the test-point sharing group that are associated to the respective one clock-gate. In this manner, the association of the test-point nodes to a given clock-gate can result in a more proximal relationship between the test-point nodes of the respective test-point sharing group on the resulting circuit layout of the circuit design 106, as provided by the circuit layout module 108. Furthermore, in the event that the test-point flop allocation module 110 determines that there are multiple clock-gates that are common to all of the flip-flops of a set of functional logic that is coupled to a given test-point node, the test-point flop allocation module 110 can assign the test-point node to the most directly coupled clock-gate (e.g., having the fewest interconnections between the respective clock-gate and the test-point node), and thus the clock-gate that is farthest downstream from the clock signal that defines the clock domain. As a result, by assigning the test-point node to the most directly coupled clock-gate, the proximity of the test-point nodes of a given test-point sharing group can be substantially optimized.

As an example, after dividing the test-point nodes by association with clock-gates, the test-point flop allocation module 110 can determine that there are more test-point flops defined in the circuit netlist NL than there are test-point sharing groups. As a result, the test-point flop allocation module 110 can be configured to subdivide at least one of the test-point sharing groups into smaller test-point sharing groups. As an example, the test-point flop allocation module 110 can subdivide the test-point nodes in each of the test-point sharing groups based on functional hierarchy tiers defined in the circuit netlist NL.

Figure 4:
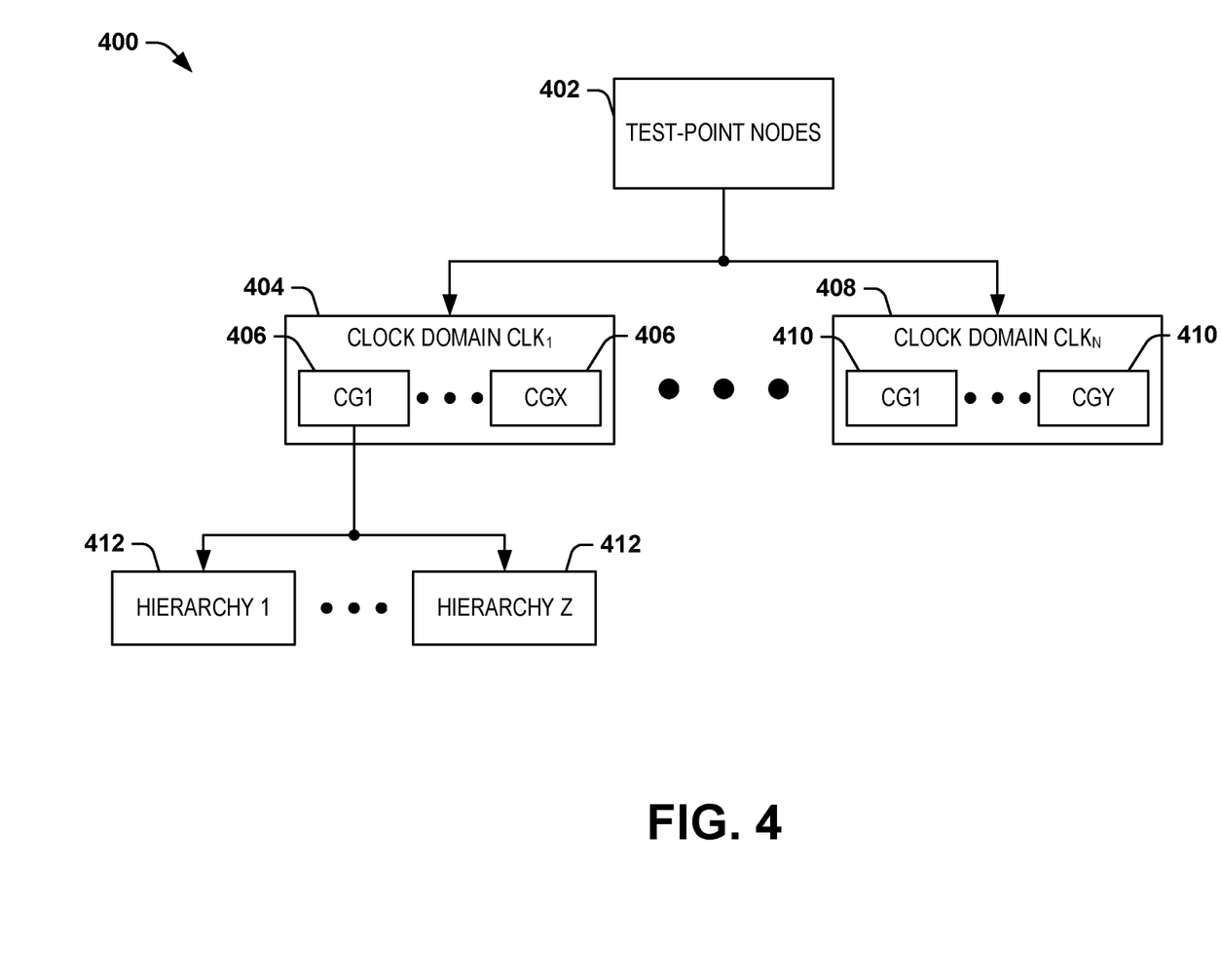
FIG. 4 illustrates an example diagram of test-point node division.

FIG. 4 illustrates an example diagram 400 of test-point node division. The diagram 400 includes a set of test-point nodes 402 that can correspond to all of the test-point nodes that are defined in the circuit netlist NL. The test-point flop allocation module 110 can divide the test-point nodes 402 into the initial test-point sharing groups based on association of the test-point nodes to the clock-gates, as described above. The diagram 400 thus demonstrates a first clock domain 404 defined by the clock signal $CLK_1$. The first clock domain 404 can thus include a portion of the test-point nodes 402 that are associated with any or all of a plurality X of clock-gates 406, demonstrated as "$CG_1$" through "$CG_X$". Thus, the test-point flop allocation module 110 can designate the sets of test-point nodes assigned to any or all of the X clock-gates 406 as test-point sharing groups. The division of the sets of test-point nodes associated with the clock-gates 406 in the first clock domain 404 can be based on the commonality of the clock-gates 406 to the test-point nodes determined based on tracing I/O backwards from each test-point node, as described above. Therefore, some of the clock-gates 406 can be associated with a given test-point sharing group, while others of the clock-gates 406 may have no associated test-point sharing group.

As described above, the circuit netlist NL can define a plurality N of clock domains that are each associated with a separate respective clock signal. The diagram 400 also demonstrates an Nth clock domain 408 defined by the clock signal CLK (e.g., with other clock domains and associated clock signals therebetween). The Nth clock domain 408 can thus include a portion of the test-point nodes 402 that are associated with any or all of a plurality Y of clock-gates 410, demonstrated as "$CG_1$" through "$CG_Y$". Thus, similar to as described above, the test-point flop allocation module 110 can designate the sets of test-point nodes assigned to any or all of the Y clock-gates 410 as test-point sharing groups. The division of the sets of test-point nodes associated with the clock-gates 410 in the Nth clock domain 408 can be based on the commonality of the clock-gates 410 to the test-point nodes determined based on tracing I/O backwards from each test-point node, as described above. Therefore, some of the clock-gates 410 can be associated with a given test-point sharing group, while others of the clock-gates 410 may have no associated test-point sharing group.

The test-point sharing groups associated with some of the clock-gates 406 and 410 can be significantly larger than others. Furthermore, as described above, the test-point flop allocation module 110 can determine that there are more test-point flops defined in the circuit netlist NL than there are test-point sharing groups created by dividing the test-point nodes based on assignment to clock-gates. Therefore, the test-point flop allocation module 110 can be configured to subdivide the test-point sharing groups in the circuit synthesis phase of designing the circuit design 106. For example, the test-point flop allocation module 110 can subdivide the test-point nodes in each of the test-point sharing groups based on functional hierarchy tiers defined in the circuit netlist NL.

In the example of FIG. 4, the test-point sharing group associated with the first clock-gate 406 of the first clock domain 404 can be subdivided into a plurality Z of test-point sharing groups based on functional hierarchy tiers defined by the circuit netlist NL. The diagram 400 includes the plurality Z of subdivided test-point sharing groups, demonstrated as hierarchy tier ("HIERARCHY") groups 412. The hierarchy tier groups 412 can thus each have a proper subset of test-point nodes as were assigned to the first clock-gate 406. As another example, the subdivision of the test-point sharing groups can provide the hierarchy tier groups 412 to have an approximately equal quantity of test-point nodes. Additional test-point sharing groups associated with other clock-gates 406 or clock-gates 410 in the Nth clock domain 408 can similarly be subdivided. In this manner, the quantity of test-point nodes for each test-point sharing group can be controlled to ensure that the quantity of test-point sharing nodes is equal to the quantity of test-point flops defined in the circuit netlist NL. Thus, the test-point flop allocation module 110 can assign each of the test-point flops to a respective one of the test-point sharing groups.

Figure 5:
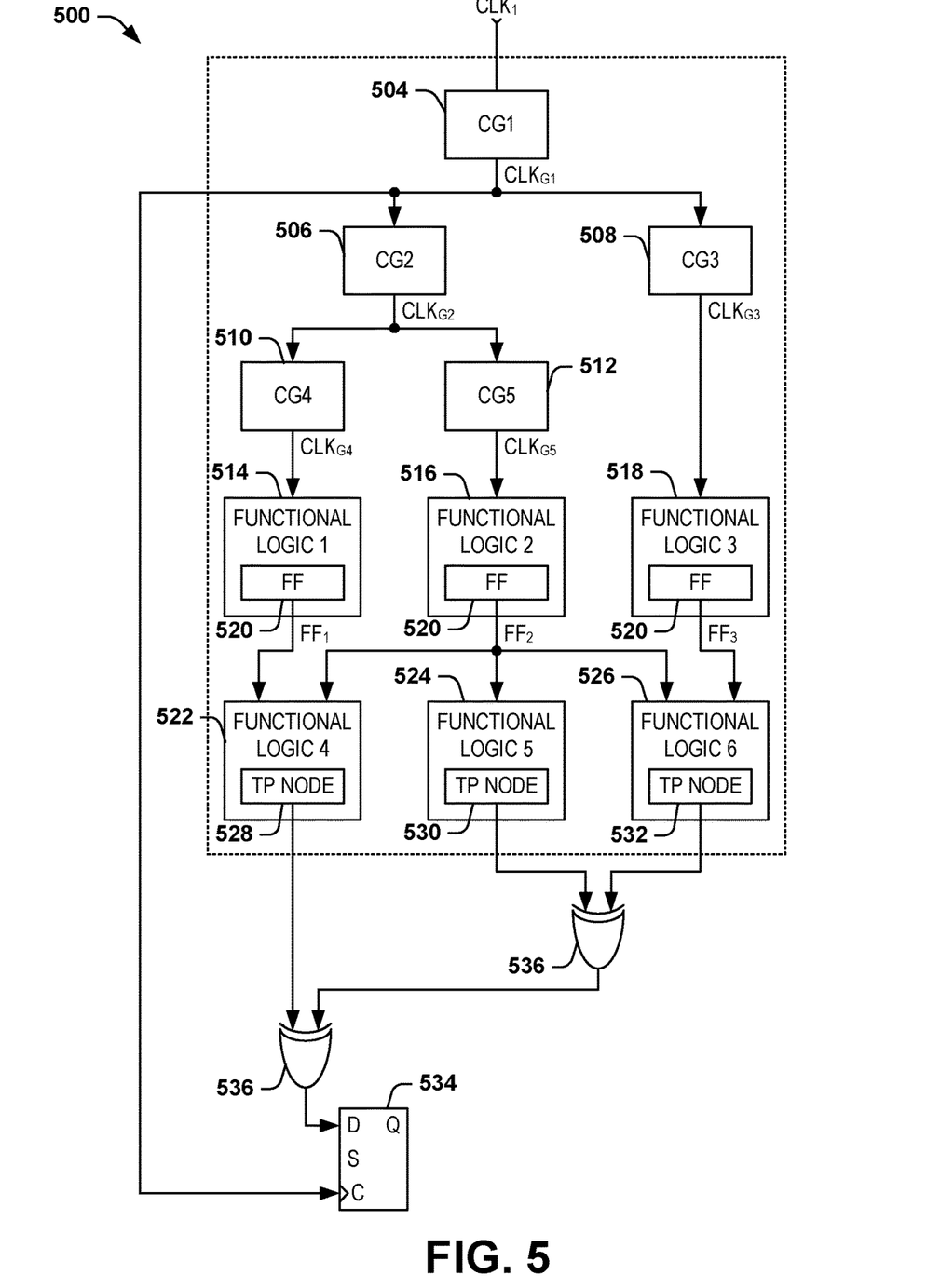
FIG. 5 illustrates an example diagram of test-point sharing in a clock domain.

After assigning a test-point flop to each of the test-point sharing groups, the test-point flop allocation module 110 can subsequently assign a clock signal to each of the test-point flops associated with each of the respective test-point sharing groups. FIG. 5 illustrates an example diagram 500 of test-point sharing in a clock domain. The diagram 500 demonstrates a clock domain defined by the clock signal $CLK_1$, which can thus correspond to the first clock domain 302 in the example of FIG. 3.

The clock signal $CLK_1$ is provided to a first clock-gate 504 that is selectively activated to provide a first clock-gate signal $CLK_{G1}$. The first clock-gate signal $CLK_{G1}$ is provided to a second clock-gate 506 that is selectively activated to provide a second clock-gate signal $CLK_{G2}$ and a third clock-gate 508 that is selectively activated to provide a third clock-gate signal $CLK_{G3}$. In the example of FIG. 5, the first gate clock signal $CLK_{G1}$ can also be provided to other (e.g., not shown) clock-gates or functional logic. The second clock-gate signal $CLK_{G2}$ is provided to a fourth clock-gate 510 that is selectively activated to provide a fourth clock-gate signal $CLK_{G4}$ and a fifth clock-gate 512 that is selectively activated to provide a fifth clock-gate signal $CLK_{G5}$. In the example of FIG. 5, the second gate clock signal $CLK_{G2}$ can also be provided to other (e.g., not shown) clock-gates or functional logic.

The fourth clock-gate signal $CLK_{G4}$ is provided to a first set of functional logic 514, the fifth clock-gate signal $CLK_{G5}$ is provided to a second set of functional logic 516, and the third clock-gate signal $CLK_{G3}$ is provided to a third set of functional logic 518. Each of the sets of functional logic 514, 516, and 518 includes at least one flip-flop ("FF") 520 that is driven by the respective clock-gate signals $CLK_{G4}$, $CLK_{G5}$, and $CLK_{G3}$. The flip-flop(s) 520 of the first set of functional logic 512 provides a data signal $FF_1$ to a fourth set of functional logic 522, the flip-flop(s) 520 of the second set of functional logic 514 provides a data signal $FF_2$ to the fourth set of functional logic 522, a fifth set of functional logic 524, and a sixth set of functional logic 526, and the flip-flop(s) 520 of the third set of functional logic 516 provides a data signal $FF_3$ to the sixth set of functional logic 526.

The fourth set of functional logic 522 is coupled to a test-point node 528, the fifth set of functional logic 524 is coupled to a test-point node 530, and the sixth set of functional logic 526 is coupled to a test-point node 532. Based on the coupling of the flip-flops 520 to the sets of functional logic 522, 524, and 526, the test-point flop allocation module 110 can have assigned each of the test-point nodes 528, 530, and 532 to the first clock-gate 504. Therefore, the test-point nodes 528, 530, and 532 can be or be part of a single test-point sharing group. Therefore, the test-point flop allocation module 110 assigns a test-point flop 534 to the test-point sharing group that includes the test-point nodes 528, 530, and 532, and can further assign XOR-gates 536 to interconnect the test-point nodes 528, 530, and 532 and the test-point flop 534.

The test-point flop allocation module 110 can thus subsequently assign a clock signal to the test-point flop 534. The determination of assignment of a clock signal to a given test-point flop is similar to as described above regarding the assignment of a test-point node to a clock-gate. To determine which clock signal to assign to the test-point flop 534, the test-point flop allocation module 110 can evaluate a logic fan-in of all of the test-point nodes 528, 530, and 532 up to the clock signal $CLK_1$ by tracing inputs and outputs in the circuit netlist NL from the test-point nodes 528, 530, and 532 to the clock signal $CLK_1$.

For example, the test-point flop allocation module 110 can trace input/output connections backwards (e.g., upstream) on the circuit netlist NL from the test-point nodes 528, 530, and 532 to an output of each of the flip-flops 520 in the sets of functional logic 514, 516, and 518. The test-point flop allocation module 110 can then trace input/output connections from a clock input of each of the flip-flop 520 to an output of each of the clock-gates 508, 510, and 512. The test-point flop allocation module 110 can then trace input/output connections from an input of each of the clock-gates 508, 510, and 512 to the clock-gates 504 and 506. The test-point flop allocation module 110 can then trace input/output connections from an input of each of the clock-gates 504 and 506 to the clock signal $CLK_1$ that defines the clock domain. The test-point flop allocation module 110 can then determine which of the clock-gates 504, 506, 508, 510, and 512 is common to each of the flip-flops 520 that provide output signals (e.g., the output signals $FF_1$, $FF_2$, and $FF_3$) to each of the test-point nodes 528, 530, and 532. The test-point flop allocation module 110 can thus couple the respective clock signal of the respective common clock-gate to the test-point flop 534 in the circuit design 106.

In the example of FIG. 5, tracing inputs/outputs backwards from the test-point nodes 528, 530, and 532 to the clock signal $CLK_1$, the test-point flop allocation module 110 determines that the flip-flop 520 of the first set of functional logic 514 passes through the fourth clock-gate 510, through the second clock-gate 506, and through the first clock-gate 504 to the clock signal $CLK_1$. Similarly, the test-point flop allocation module 110 determines that the flip-flop 520 of the second set of functional logic 516 passes through the fifth clock-gate 512, through the second clock-gate 506, and through the first clock-gate 504 to the clock signal $CLK_1$. Furthermore, the test-point flop allocation module 110 determines that the flip-flop 520 of the third set of functional logic 518 passes through the third clock-gate 508 and through the first clock-gate 504 to the clock signal $CLK_1$. Therefore, the test-point flop allocation module 110 can determine that the only clock-gate that is common to the flip-flops 520 of the sets of functional logic 514, 516, and 518 that provide signals to all of the test-point nodes 528, 530, and 532 in the test-point sharing group is the first clock-gate 504. Therefore, the test-point flop allocation module 110 can provide the clock signal $CLK_{G1}$ to the test-point flop 534 in the circuit design 106. Accordingly, in the example of FIG. 5, the clock signal $CLK_{G1}$ is provided to the clock input of the test-point flop 534.

The assignment of a clock signal to the test-point flop 534 can be provided in the circuit netlist NL by the test-point flop allocation module 110. Therefore, by assigning a clock signal associated with one of the clock-gates 504, 506, 508, 510, and 512 to the test-point flop 534 in the circuit netlist NL, the test-point flop 534 can be arranged more proximal to the test-point nodes 528, 530, and 532 of the corresponding test-point sharing group on the circuit layout of the circuit design 106. Thus, the association of the clock signals from the respective clock-gates to the respective test-point flops in the circuit netlist NL result in a proximal arrangement of the test-point flops to the test-point nodes of the respective test-point sharing groups in the circuit layout generated by the circuit layout module 108.

Figure 6:
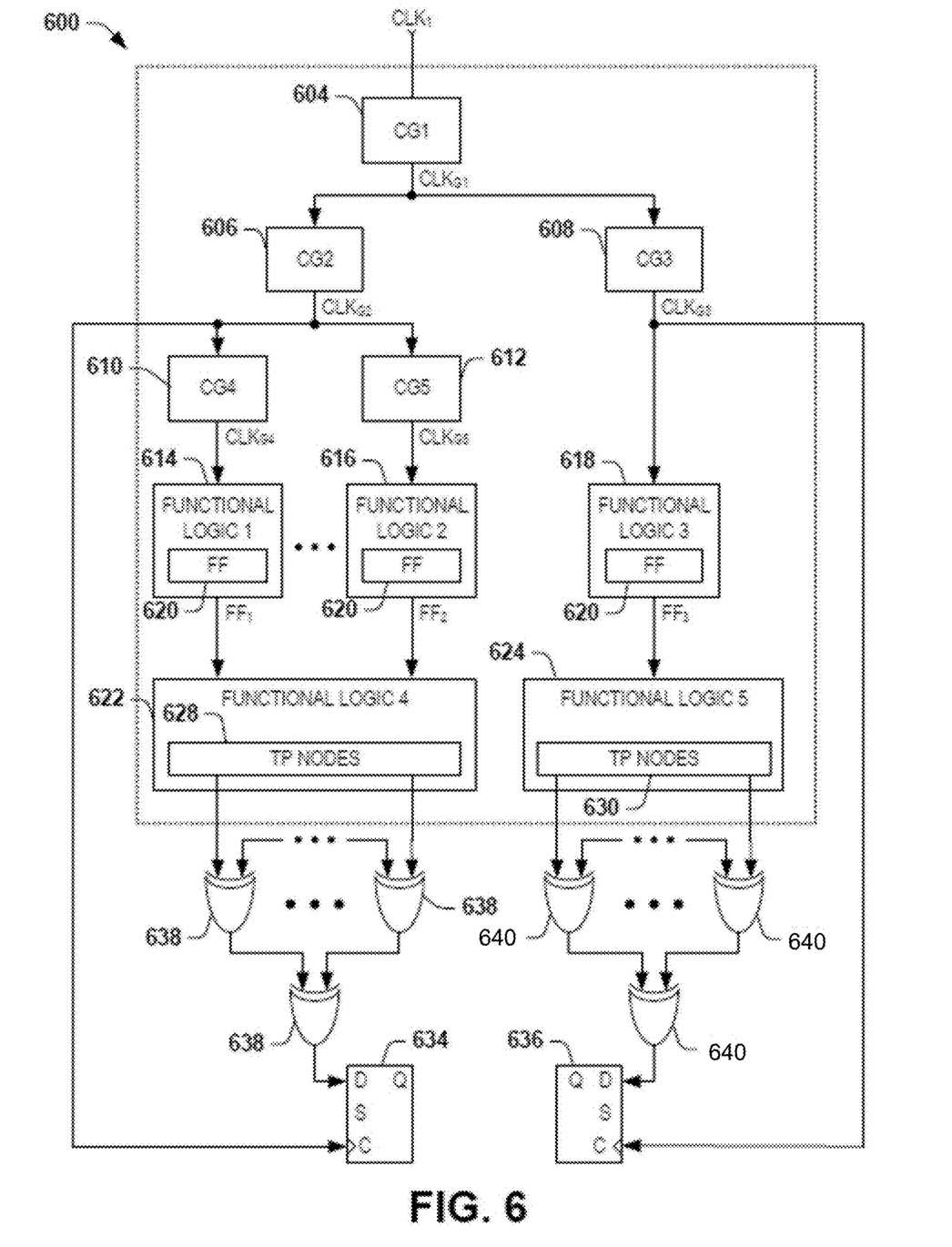
FIG. 6 illustrates an example diagram of splitting test-point sharing across two-flops based on associated clock-gates in a clock domain.

While the clock signal $CLK_{G1}$ is provided from the same clock-gate 504 as is assigned to the test-point sharing group by the test-point flop allocation module 110, it is possible after subdivision of the test-point sharing groups that a different clock signal can be provided to the respective test-point flops of the subdivided test-point sharing group. FIG. 6 illustrates an example diagram 600 of splitting test-point sharing across two-flops based on associated clock-gates in a clock domain. The diagram 600 demonstrates a clock domain defined by the clock signal $CLK_1$, which can thus correspond to the first clock domain 302 in the example of FIG. 3.

The clock signal $CLK_1$ is provided to a first clock-gate 604 that is selectively activated to provide a first clock-gate signal $CLK_{G1}$. The first clock-gate signal $CLK_{G1}$ is provided to a second clock-gate 606 that is selectively activated to provide a second clock-gate signal $CLK_{G2}$ and a third clock-gate 608 that is selectively activated to provide a third clock-gate signal $CLK_{G3}$. In the example of FIG. 6, the first gate clock signal $CLK_{G1}$ can also be provided to other (e.g., not shown) clock-gates or functional logic. The second clock-gate signal $CLK_{G2}$ is provided to a fourth clock-gate 610 that is selectively activated to provide a fourth clock-gate signal $CLK_{G4}$ and a fifth clock-gate 612 that is selectively activated to provide a fifth clock-gate signal $CLK_{G5}$. In the example of FIG. 6, the second gate clock signal $CLK_{G2}$ can also be provided to other (e.g., not shown) clock-gates or functional logic.

The fourth clock-gate signal $CLK_{G4}$ is provided to a first set of functional logic 614, the fifth clock-gate signal $CLK_{G5}$ is provided to a second set of functional logic 616, and the third clock-gate signal $CLK_{G3}$ is provided to a third set of functional logic 618. Each of the sets of functional logic 614, 616, and 618 includes at least one flip-flop ("FF") 620 that is driven by the respective clock-gate signals $CLK_{G4}$, $CLK_{G5}$, and $CLK_{G3}$. The flip-flop(s) 620 of the first set of functional logic 614 and the flip-flop(s) 620 of the second set of functional logic 614 provide respective data signals $FF_1$ and $FF_2$ to a fourth set of functional logic 622. The flip-flop(s) 620 of the third set of functional logic 616 provides a data signal $FF_3$ to a fifth set of functional logic 624.

The fourth set of functional logic 622 is coupled to a plurality of test-point nodes 628, and the fifth set of functional logic 624 is coupled to a plurality of test-point nodes 630. As an example, based on the coupling of the flip-flops 620 to the sets of functional logic 622 and 624, the test-point flop allocation module 110 can have assigned each of the test-point nodes 628 and 630 to the first clock-gate 604. However, the test-point flop allocation module 110 can have subdivided the initial test-point sharing node that included the test-point nodes 628 and 630 into separate smaller test-point sharing nodes, such that the test-point nodes 628 form a first test-point sharing group and the test-point nodes 630 form a second test-point sharing group. Therefore, the test-point nodes 628 can be or be part of a single test-point sharing group, and the test-point nodes 630 can be or be part of a separate single test-point sharing group. Therefore, the test-point flop allocation module 110 assigns a first test-point flop 634 to the first test-point sharing group that includes the test-point nodes 628 and a second test-point flop 636 to the second test-point sharing group that includes the test-point nodes 630. The test-point flop allocation module 110 can also assign XOR-gates 638 to interconnect the test-point nodes 628 to the first test-point flop 634 and XOR-gates 640 to interconnect the test-point nodes 630 and the second test-point flop 636.

The test-point flop allocation module 110 can thus subsequently assign a clock signal to each of the test-point flops 634 and 636. The determination of assignment of a clock signal to a given test-point flop is similar to as described above regarding the assignment of a test-point node to a clock-gate. In the example of FIG. 6, tracing inputs/outputs backwards from the test-point nodes 628 to the clock signal $CLK_1$, the test-point flop allocation module 110 determines that the flip-flop 620 of the first set of functional logic 614 passes through the fourth clock-gate 610, through the second clock-gate 606, and through the first clock-gate 604 to the clock signal $CLK_1$. Similarly, the test-point flop allocation module 110 determines that the flip-flop 620 of the second set of functional logic 616 passes through the fifth clock-gate 612, through the second clock-gate 606, and through the first clock-gate 604 to the clock signal $CLK_1$. Therefore, the test-point flop allocation module 110 determines that both the first clock-gate 604 and the second clock-gate 606 are common to the flip-flops 620 of the sets of functional logic 614 and 616 that provide signals to all of the test-point nodes 628 in the test-point sharing group. However, similar to as described above regarding the association of the test-point nodes to the clock-gate, in the event that the test-point flop allocation module 110 determines that there are multiple clock-gates that are common to all of the flip-flops of a set of functional logic that is coupled to a set of test-point nodes, the test-point flop allocation module 110 can assign the clock signal of the most directly coupled clock-gate (e.g., having the fewest interconnections between the respective clock-gate and the test-point node) to the respective test-point flop. Therefore, because the second clock-gate 606 is more directly coupled to the flip-flops 620 of the sets of functional logic 614 and 616, the test-point flop allocation module 110 can provide the clock signal $CLK_{G2}$ from the second clock-gate 606 to the test-point flop 634 in the circuit design 106. Accordingly, in the example of FIG. 6, the clock signal $CLK_{G2}$ is provided to the clock input of the test-point flop 634.

A similar determination can be provided for determining the clock signal for the second test-point flop 636. In the example of FIG. 6, tracing inputs/outputs backwards from the test-point nodes 630 to the clock signal $CLK_1$, the test-point flop allocation module 110 determines that the flip-flop 620 of the third set of functional logic 618 passes through the third clock-gate 608 and through the first clock-gate 604 to the clock signal $CLK_1$. Therefore, the test-point flop allocation module 110 determines that both the first clock-gate 604 and the third clock-gate 608 are common to the flip-flops 620 of the third set of functional logic 618 that provides signals to all of the test-point nodes 630 in the test-point sharing group. However, because the third clock-gate 608 is more directly coupled to the flip-flops 620 of the third set of functional logic 618, the test-point flop allocation module 110 can provide the clock signal $CLK_{G3}$ from the third clock-gate 608 to the test-point flop 636 in the circuit design 106. Accordingly, in the example of FIG. 6, the clock signal $CLK_{G3}$ is provided to the clock input of the test-point flop 636.

As described above, by associating each of the test-point sharing groups to a respective clock-gate, the circuit layout module 108 can generate the circuit layout in a manner that groups the test-point nodes of a test-point sharing group more proximally with respect to each other. Thus, the allocation of a test-point flop to each of the test-point sharing groups by the test-point flop allocation module 110 can thus likewise result in an arrangement of the test-point flops proximal to the test-point nodes in the respective test-point sharing group in the circuit layout.

Figure 7:
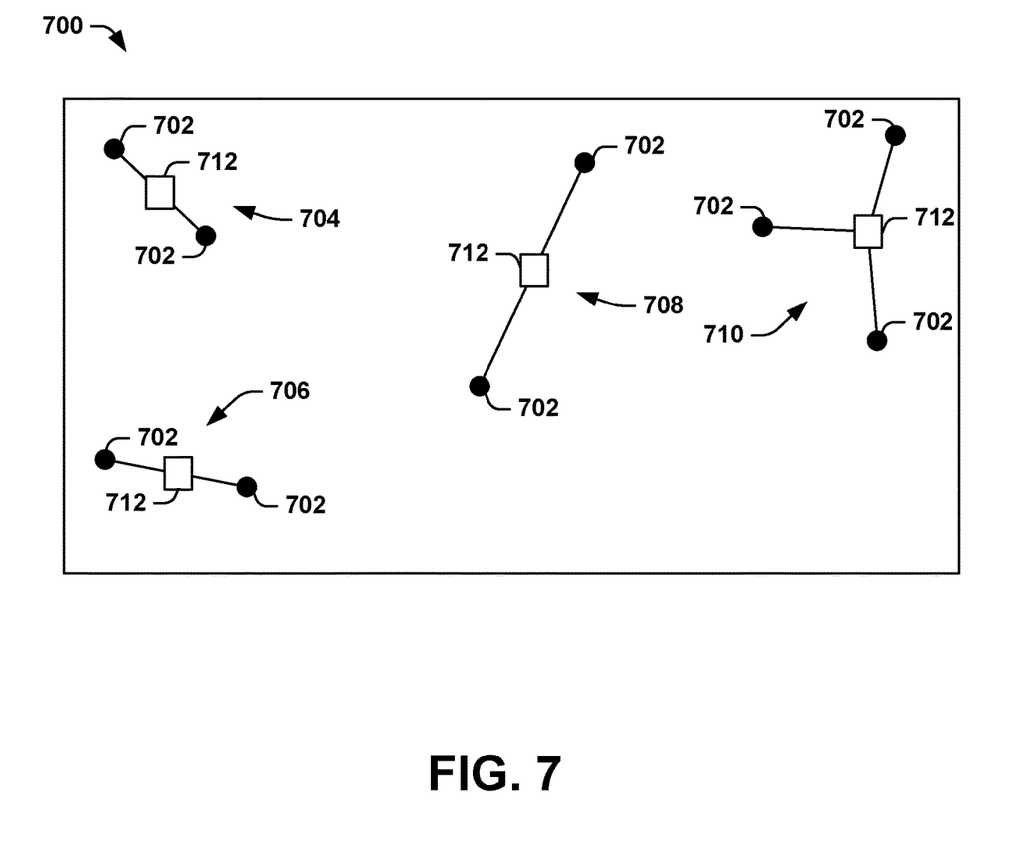
FIG. 7 illustrates an example diagram of a circuit layout.

FIG. 7 illustrates an example diagram of a circuit layout 700. The circuit layout 700 demonstrates a plurality of test-point nodes 702 physically arranged on the circuit layout 700 by the circuit layout module 108. The test-point nodes 702 are arranged in test-point sharing groups based on association to a clock-gate in a respective clock domain, as described above. In the example of FIG. 7, the test-point nodes 702 are arranged in a first test-point sharing group 704, a second test-point sharing group 706, a third test-point sharing group 708, and a fourth test-point sharing group 710. The example of FIG. 7 demonstrates only nine test-point nodes 702 for simplistic example, such that an actual circuit layout can include hundreds or thousands of test-point nodes 702 arranged in hundreds of test-point sharing groups.

The circuit layout 700 also demonstrates test-point flops 712 having been allocated to the test-point sharing groups by the test-point flop allocation module 110 based on the designation of the test-point nodes 702 in the test-point sharing groups. As described herein, the assignment of the test-point nodes 702 to the clock-gates for purposes of generating the test-point sharing groups 704, 706, 708, and 710 provide for a proximal relationship of the test-point nodes 702 to each other in a test-point sharing group. Thus, by allocating the test-point flops 712 to the test-point sharing groups 704, 706, 708, and 710 and assigning the clock signals provided from the respective clock-gates to the test-point flops 712, the test-point flops 712 can likewise be arranged proximal to the test-point nodes 702 in the respective one of the test-point sharing groups 704, 706, 708, and 710.

Upon the test-point flops 712 being allocated in the circuit layout 700, the circuit layout module 108 can facilitate relocation of the test-point flops 712 (e.g., to an approximate centroid location of the test-point nodes 702 in a given one of the test-point sharing groups 704, 706, 708, and 710). The circuit layout module 108 can thus adjust the locations of each of the test-point flops 712 and surrounding functional logic to fit the relocated test-point flops 712. For example, while the functional logic is not demonstrated in the examples of FIG. 7, the circuit layout 700 is filled with the functional logic, as provided by the circuit layout module 108 from the circuit netlist NL. Therefore, when the test-point flops 712 are relocated, it is very highly likely that the relocated position of the test-point flops 712 would overlap existing functional logic. Accordingly, the circuit layout module 108 (e.g., an associated place-and-route tool) can provide minor adjustments to the locations of the functional logic and/or the test-point flops 712 to facilitate the relocation of the test-point flops 712 to the approximate centroid locations of the test-point sharing groups 704, 706, 708, and 710. Similarly, the XOR gates (not shown) that provide the conductive coupling of the test-point nodes 702 to the test-point flops 712 can likewise be relocated and adjusted by the circuit layout module 108.

Upon relocating and adjusting the test-point flops 712 and associated logic (e.g., the XOR gates), the circuit layout module 108 can then provide the wiring interconnect between the test-point flops 712 to form the associated scan-chains (e.g., the scan-chain 212). The circuit layout 700 thus demonstrates the wiring interconnects between the test-point nodes 702 and the test-point flops 712 in an efficient manner based on the assignment of the test-point nodes 702 to the clock-gates in designating the test-point sharing groups 704, 706, 708, and 710.

Accordingly, after relocating, adjusting, and rewiring the test-point flops 712 and associated logic (e.g., the XOR gates), the circuit layout module 108 can provide the circuit layout 700 as a final circuit layout that can be provided to the fabrication tool 112 to be fabricated as the IC 102.

Figure 8:
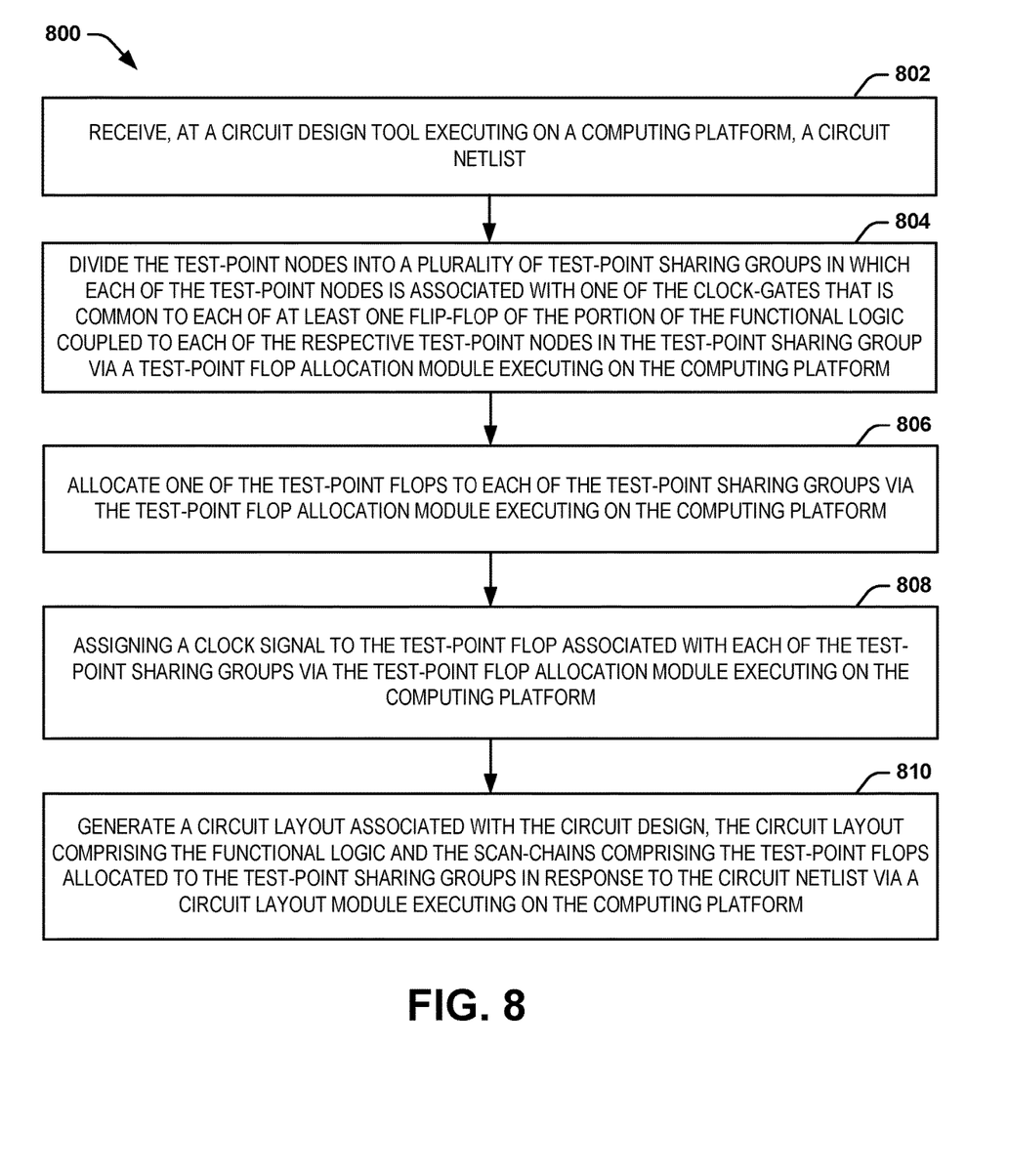
FIG. 8 illustrates an example of a method for allocating test-point flops in scan-chains of a circuit design.

In view of the foregoing structural and functional features described above, an example method will be better appreciated with reference to FIG. 8. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 8 illustrates an example of a method for allocating test-point flops (e.g., the test-point flops 214) in scan-chains of a circuit design (e.g., the circuit design 106). At 802, at a circuit design tool (e.g., the circuit design tool 104) executing on a computing platform, a circuit netlist (e.g., the circuit netlist NL) is received. The circuit netlist includes functional logic (e.g., the functional logic 202), the test-point nodes (e.g., the test-point nodes 204, 206, 208, and 210) coupled to portions of the functional logic, a plurality of clock-gates (e.g., the clock-gates 304, 306, 308, 310, and 312) and the test-point flops. At 804, the test-point nodes are divided into a plurality of test-point sharing groups (e.g., the test-point sharing groups 704, 706, 708, and 710). Each of the test-point sharing groups can be associated with one of the clock-gates via a test-point flop allocation module (e.g., the test-point flop allocation module 110) executing on the computing platform.

At 806, one of the test-point flops is allocated to each of the test-point sharing groups via the test-point flop allocation module executing on the computing platform. At 808, a clock signal (e.g., one of the clock signals $CLK_{G1}$, $CLK_{G2}$, $CLK_{G3}$, $CLK_{G4}$, and $CLK_{G5}$) is assigned to the test-point flop associated with each of the test-point sharing groups via the test-point flop allocation module executing on the computing platform. The clock signal can be output from a respective one of the clock-gates that is common to each of at least one flip-flop (e.g., the flip-flops 320) of the portion of the functional logic coupled to the test-point nodes of the respective one of the test-point sharing groups. At 810, a circuit layout (e.g., the circuit layout 700) associated with the circuit design is generated. The circuit layout includes the functional logic and the scan-chains comprising the test-point flops allocated to the test-point sharing groups in response to the circuit netlist via a circuit layout module (e.g., the circuit layout module 108) executing on the computing platform. The circuit layout is employable to fabricate an integrated circuit (IC) chip.

Figure 9:
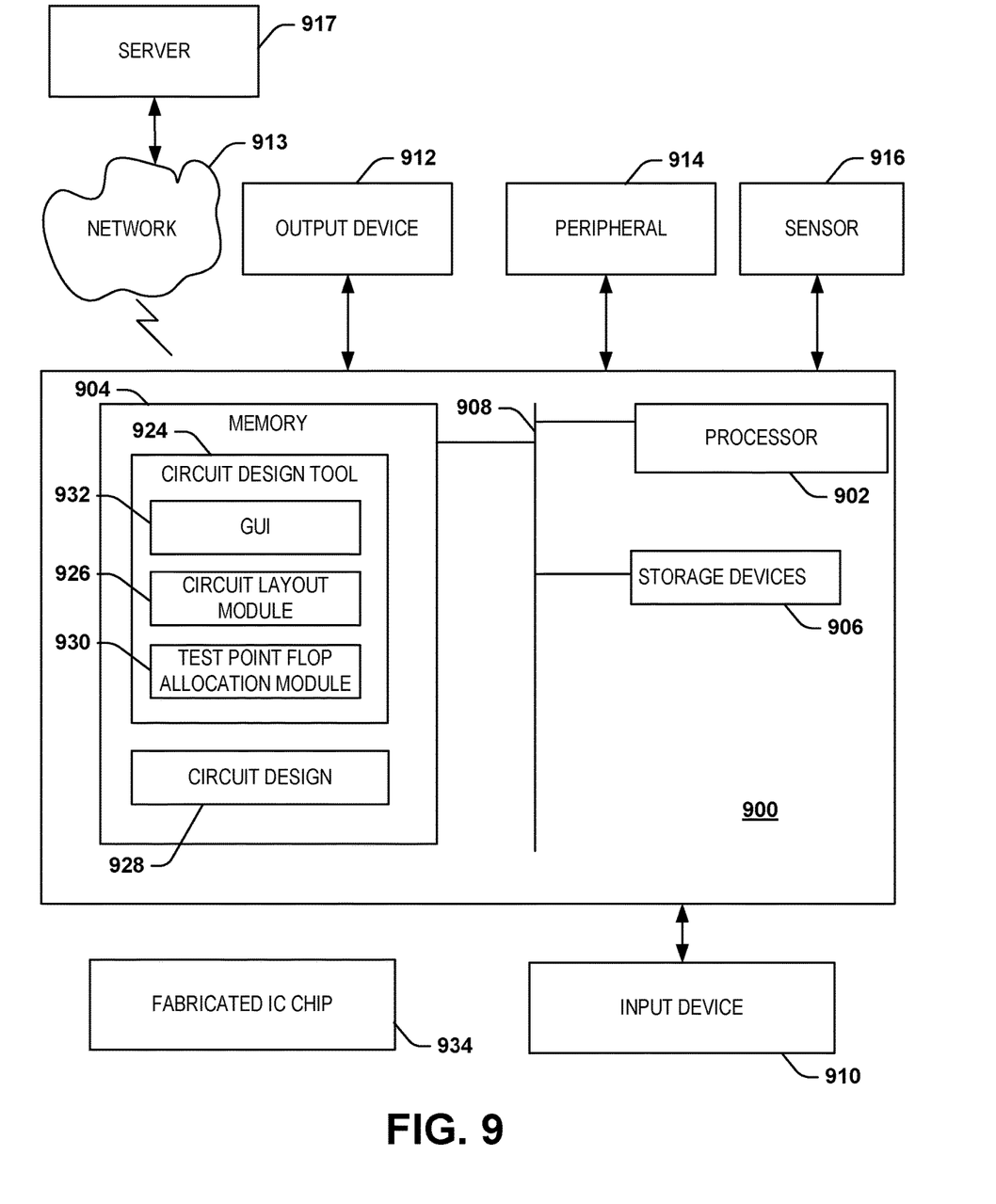
FIG. 9 illustrates an example of a computing system employable to execute a test-point flop allocation module.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. FIG. 9 illustrates an example of a computing system 900 employable to execute a test-point flop allocation module.

As shown in FIG. 9, the computing system 900 can include a computer processor 902, associated memory 904 (e.g., RAM), cache memory, flash memory, etc.), one or more storage devices 906 (e.g., a solid state drive, a hard disk drive, an optical drive such as a compact disk (CD) drive or digital versatile disk (DVD) drive, a flash memory stick, etc.) and numerous other elements and functionalities. The computer processor 902 may be an IC chip for processing instructions. For example, the computer processor may be one or more cores, or micro-cores of a processor. Components of the computing system 900 can communicate over a data bus 908.

The computing system 900 may also include an input device 910, such as any combination of one or more of a touchscreen, keyboard, mouse, microphone, touchpad, electronic pen, or any other input device. Further, the computing system 900 can include an output device 912, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 912 can be the same physical device as the input device 910. In other examples, the output device 912 and the input device 910 can be implemented as separate physical devices. The computing system 900 can be connected to a network 913 (e.g., LAN, a wide area network (WAN) such as the Internet, a mobile network, or any other type of network) via a network interface connection (not shown). The input device 910 and output device(s) 912 can be connected locally and/or remotely (e.g., via the network 913) to the computer processor 902, the memory 904 and/or the storage devices 906. Many different types of computing systems exist, and the aforementioned input device 910 and the output device 912 can take other forms. The computing system 900 can further include a peripheral 914 and a sensor 916 for interacting with the environment of the computing system 900 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 900 can communicate with a server 917 via the network 913.

The memory 904 can include a circuit design tool 924. The circuit design tool 924 can include any of a variety of EDA applications. The circuit design tool 924 includes a circuit layout module 926 for generating a circuit layout of a circuit design 928 that is likewise saved in the memory 904, such as described herein. The circuit design tool 924 can further include a test-point flop allocation module 930 that is configured to divide the test-point nodes into test-point sharing groups based on assigning the test-point nodes to clock-gates. The test-point flop allocation module 930 can also be configured to allocate the test-point flops to the test-point sharing groups, such that data of each of the test-point sharing groups can be observed by a single test-point flop in a testing mode. Additionally, the circuit design tool 924 can include a GUI 932 for facilitating generation of the circuit design 928, including providing user implementation of the circuit layout module 926 and the test-point flop allocation module 930. The circuit design 928 can thus be fabricated as an IC chip 934, such that the fabricated IC chip 934 can correspond directly to the circuit design 928.

Further, one or more elements of the aforementioned computing system 900 can be located at a remote location and connected to the other elements over the network 913. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   a non-transitory memory that stores machine-readable instructions and receives a circuit netlist associated with a circuit design, the circuit netlist comprising functional logic, test-point nodes coupled to portions of the functional logic, a plurality of clock-gates, and a plurality of test-point flops associated with scan-chains; and
   a processing unit that accesses the memory and executes the machine-readable instructions, the machine-readable instructions comprising an electronic design automation (EDA) application, the EDA application comprising:
   a test-point flop allocation module that is configured to divide the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group, the test-point flop allocation module being further configured to allocate one of the test-point flops to each of the test-point sharing groups in the circuit netlist; and a circuit layout module configured to generate a circuit layout associated with the circuit design based on the circuit netlist.

2. The system of claim 1, wherein the test-point flop allocation module is configured to trace input/output connections backwards on the circuit netlist from the test-point node to an output of each of the at least one flip-flop in the portion of the functional logic, from a clock input of each of the at least one flip-flop to an output of each of the clock-gates, and from an input of each of the clock-gates to a clock signal that defines an associated clock domain to determine the respective one of the clock-gates that is common to each of the at least one flip-flop of the portion of the functional logic.

3. The system of claim 2, wherein the test-point flop allocation module selects the respective one of the clock-gates that is most directly coupled to the at least one flip-flop of the portion of the functional logic in response to the test-point flop allocation module determining multiple clock-gates common to each of the at least one flip-flop of the portion of the functional logic.

4. The system of claim 1, wherein the test-point flop allocation module is further configured to subdivide the test-point nodes in the test-point sharing groups into smaller test-point sharing groups based on functional hierarchy tiers defined in the circuit netlist.

5. The system of claim 1, wherein the test-point flop allocation module is further configured to assign a clock signal to the test-point flop associated with each of the test-point sharing groups, the clock signal being output from the respective one of the clock-gates that is common to each of the at least one flip-flop of the portion of the functional logic coupled to the test-point nodes of the respective one of the test-point sharing groups, wherein the circuit layout module is configured to arrange the test-point flops proximal to the test-point nodes of the respective one of test-point sharing groups on the circuit layout based on the assignment of the clock signal from the respective one of the clock-gates.

6. The system of claim 1, wherein, in response to a quantity of the test-point sharing groups being less than a quantity of the test-point flops, the test-point flop allocation module is further configured to subdivide the test-point nodes in the test-point sharing groups into smaller test-point sharing groups based on functional hierarchy tiers defined in the circuit netlist.

7. The system of claim 6, wherein the test-point flop allocation module is further configured to assign a clock signal to the test-point flop associated with each of the test-point sharing groups, the clock signal being output from a respective one of the clock-gates that is common to each of at least one flip-flop of the portion of the functional logic coupled to the test-point nodes of the respective one of the test-point sharing groups.

8. The system of claim 1, wherein, in response to the circuit layout module generating the circuit layout, the circuit layout module is further configured to receive user inputs to facilitate relocation of each of the test-point flops proximal to a respective one of the test-point sharing groups in the circuit layout of the circuit design.

9. The system of claim 8, wherein the circuit layout module is further configured to provide interconnects between the relocated test-point flops in the circuit layout to form the scan-chains.

10. A non-transitory computer readable medium comprising machine-readable instructions, the machine-readable instructions being executed to:

receive, at a circuit design tool executing on a computing platform, a circuit netlist associated with a circuit design, the circuit netlist comprising functional logic, test-point nodes coupled to portions of the functional logic, a plurality of clock-gates, and a plurality of test-point flops associated with scan-chains;

divide the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group via a test-point flop allocation module executing on the computing platform;

allocate one of the test-point flops to each of the test-point sharing groups in the circuit netlist via the test-point flop allocation module executing on the computing platform; and generate a circuit layout associated with the circuit design via a circuit layout module executing on the computing platform based on the circuit netlist, wherein the circuit layout is employable to fabricate an integrated circuit (IC) chip.

11. The medium of claim 10, wherein the test-point flop allocation module is configured to trace input/output connections backwards on the circuit netlist from the test-point node to an output of each of the at least one flip-flop in the portion of the functional logic, from a clock input of each of the at least one flip-flop to an output of each of the clock-gates, and from an input of each of the clock-gates to a clock signal that defines an associated clock domain to determine the respective one of the clock-gates that is common to each of the at least one flip-flop of the portion of the functional logic.

12. The medium of claim 11, wherein the test-point flop allocation module selects the respective one of the clock-gates that is most directly coupled to the at least one flip-flop of the portion of the functional logic in response to the test-point flop allocation module determining multiple clock-gates common to each of the at least one flip-flop of the portion of the functional logic.

13. The medium of claim 10, wherein, in response to a quantity of the test-point sharing groups being less than a quantity of the test-point flops, the test-point flop allocation module is further configured to subdivide the test-point nodes in the test-point sharing groups into smaller test-point sharing groups based on functional hierarchy tiers defined in the circuit netlist.

14. The medium of claim 13, wherein the test-point flop allocation module is further configured to assign a clock signal to the test-point flop associated with each of the test-point sharing groups, the clock signal being output from a respective one of the clock-gates that is common to each of at least one flip-flop of the portion of the functional logic coupled to the test-point nodes of the respective one of the test-point sharing groups.

15. The medium of claim 10, wherein the test-point flop allocation module is further configured to assign a clock signal to the test-point flop associated with each of the test-point sharing groups, the clock signal being output from the respective one of the clock-gates that is common to each of the at least one flip-flop of the portion of the functional logic coupled to the test-point nodes of the respective one of the test-point sharing groups, wherein the circuit layout module is configured to arrange the test-point flops proximal to the test-point nodes of the respective one of test-point sharing groups on the circuit layout based on the assignment of the clock signal from the respective one of the clock-gates.

16. A method for allocating test-point flops in scan-chains of a circuit design, the method comprising:

receiving, at a circuit design tool executing on a computing platform, a circuit netlist associated with a circuit design, the circuit netlist comprising functional logic, test-point nodes coupled to portions of the functional logic, a plurality of clock-gates, and a plurality of test-point flops associated with scan-chains;

dividing the test-point nodes into a plurality of test-point sharing groups in which each of the test-point nodes is associated with one of the clock-gates that is common to each of at least one flip-flop of the portion of the functional logic coupled to each of the respective test-point nodes in the test-point sharing group via a test-point flop allocation module executing on the computing platform;

allocate one of the test-point flops to each of the test-point sharing groups via the test-point flop allocation module executing on the computing platform;

assigning a clock signal to the test-point flop associated with each of the test-point sharing groups via the test-point flop allocation module executing on the computing platform, the clock signal being output from a respective one of the clock-gates that is common to each of at least one flip-flop of the portion of the functional logic coupled to the test-point nodes of the respective one of the test-point sharing groups; and generating a circuit layout associated with the circuit design based on the circuit netlist via a circuit layout module executing on the computing platform, wherein the circuit layout is employable to fabricate an integrated circuit (IC) chip.

17. The method of claim 16, wherein determining one of the clock-gates comprises tracing input/output connections backwards on the circuit netlist from the test-point node to an output of each of the at least one flip-flop in the portion of the functional logic, from a clock input of each of the at least one flip-flop to an output of each of the clock-gates, and from an input of each of the clock-gates to a clock signal corresponding to an associated clock domain.

18. The method of claim 17, further comprising selecting the respective one of the clock-gates that is most directly coupled to the at least one flip-flop of the portion of the functional logic in response to determining multiple clock-gates common to each of the at least one flip-flop of the portion of the functional logic.

19. The method of claim 16, wherein dividing the test-point nodes comprises subdividing the test-point nodes in the test-point sharing groups into smaller test-point sharing groups based on functional hierarchy tiers defined in the circuit netlist in response to a quantity of the test-point sharing groups being less than a quantity of the test-point flops.

20. The method of claim 16, further comprising assigning a clock signal to the test-point flop associated with each of the test-point sharing groups, the clock signal being output from a respective one of the clock-gates that is common to each of at least one flip-flop of the portion of the functional logic coupled to the test-point nodes of the respective one of the test-point sharing groups via the test-point flop allocation module.

* * * * *